United States Patent [19]

Musser et al.

[11] Patent Number: 5,526,871
[45] Date of Patent: Jun. 18, 1996

[54] QUICK CONNECT DIAGNOSTIC APPARATUS AND METHOD FOR A VEHICLE COOLING SYSTEM

[76] Inventors: Marshall R. Musser, 6793 Trafford Ct., Middletown, Ohio 45044; George A. Brunermann, Jr., 5456 Red Oak Dr., Cincinnati, Ohio 45238

[21] Appl. No.: 193,242

[22] Filed: Feb. 8, 1994

[51] Int. Cl.$^6$ .............................. G01K 1/08; G01K 1/14; G01K 13/00
[52] U.S. Cl. .................. 165/11.1; 374/145; 73/116; 73/117.3; 340/439; 340/449
[58] Field of Search .................. 165/11.1; 374/145; 73/116, 117.3; 340/449, 439

[56] References Cited

U.S. PATENT DOCUMENTS

| | | |
|---|---|---|
| 1,393,968 | 10/1921 | Rishel . |
| 1,577,847 | 3/1926 | Nielson, Jr. . |
| 1,784,756 | 12/1930 | Schlaich . |
| 2,426,077 | 8/1947 | Bak . |
| 3,262,314 | 7/1966 | Gregg ................... 374/145 |
| 3,302,171 | 1/1967 | Sensing .................. 374/145 |
| 3,683,683 | 8/1972 | Demidov et al. .......... 374/145 |
| 3,779,079 | 12/1973 | Snook . |
| 4,069,712 | 1/1978 | Armstrong et al. ....... 374/145 |
| 4,276,775 | 7/1981 | Provasnik . |
| 4,393,365 | 7/1983 | Kondo et al. ............ 374/145 |
| 4,463,800 | 8/1984 | Hadden . |
| 4,598,581 | 7/1986 | Brekke .................. 374/145 |
| 4,702,619 | 10/1987 | Camp et al. . |
| 4,702,620 | 10/1987 | Ford ..................... 374/145 |
| 4,848,925 | 7/1989 | Jacques . |
| 5,020,007 | 5/1991 | Wu et al. ............... 374/145 |
| 5,107,247 | 4/1992 | Malaca . |
| 5,201,840 | 4/1993 | Sausner et al. . |

Primary Examiner—John K. Ford
Attorney, Agent, or Firm—Wood, Herron & Evans

[57] ABSTRACT

A quick connect diagnostic apparatus for the cooling system of a vehicle engine includes first, second and third temperature sensors which are configured to attach to liquid hoses which circulate cooling liquid throughout the engine, the first sensor attaching to a hose directly from the engine, the second and third sensors attaching to input and output hoses, respectively, connected to the radiator. The sensors are housed within a cuff structure which is wrapped around the hoses to detect the fluid temperatures within the hoses. Each sensor is connected to an analyzer which compares the first signal to a temperature threshold signal, compares the first signal to the second signal to generate a first difference signal which is then compared to a thermostat threshold signal, and compares the second and third signals to produce a second different signal which is compared to a radiator threshold signal. The analyzer utilizes the various difference signals and temperature signals to produce output signals indicative of the engine temperature, and the operational status of the radiator and thermostat. Output circuitry electrically coupled to the analyzer provides humanly perceptible outputs in response to the output signals from the analyzer.

36 Claims, 4 Drawing Sheets

QUICK CONNECT DIAGNOSTIC APPARATUS AND METHOD FOR A VEHICLE COOLING SYSTEM

FIELD OF THE INVENTION

This invention relates generally to testing and analyzing a vehicle engine cooling system and specifically to an apparatus and method for quickly and accurately analyzing the cooling system to determine whether various components of the system are functioning properly.

BACKGROUND OF THE INVENTION

Internal combustion engines, such as automobile and other vehicle engines, operate at relatively high temperatures due generally to the internal combustion and the friction of the moving parts. If the engine temperature gets too hot, the engine may malfunction, or worse, the moving metal parts of the engine may seize up and ruin the engine. Accordingly, most vehicle internal combustion engines are coupled to a cooling system which maintains the temperature within a preferred operating range to insure proper functioning of the engine and reduced wear.

One type of commonly used cooling system is a closed loop liquid cooling system. In a closed loop system, a cooling liquid such as water or antifreeze or a mixture of both, is circulated through the engine to cool it. To this end, the engine has several passages formed therein through which the cooling liquid is circulated. The cooling liquid absorbs the engine heat and is circulated to another part of the system to dissipate that heat. The recirculated cooling liquid is constantly heated and cooled to cool the engine as it operates.

In a typical vehicle, the cooling system includes a water pump connected in the loop of the cooling system to drive the cooling liquid through the engine. A thermostat valve which is mounted proximate the engine controls the flow of the liquid. The thermostat valve opens when the vehicle engine reaches a particular temperature so that the liquid may circulate through the closed loop system and cool the engine. However, a cold engine does not function properly either, and therefore, a normally operating thermostat will remain closed and prevent circulation of the cooling liquid until the engine heats up to a desirable temperature range, and will then subsequently open to allow circulation of the cooling liquid.

The liquid passes out of the engine, through the thermostat, and through a hose which connects the thermostat to a heat exchange unit commonly referred to as a radiator. The radiator is metal and has a plurality of fins which absorb the heat from the heated liquid. Through air convection the fins dissipate the heat absorbed by the radiator. By passing through the radiator, the hot fluid from the engine is cooled and passes through an output hose back to the engine to again be heated while cooling the hot engine. As the engine runs and the vehicle moves, the cooling fluid is continuously circulated and recirculated through the closed loop cooling system to keep the engine running properly. A fan might be used proximate the radiator to supply a convective stream of air when the vehicle is not moving.

Additional heat exchangers also cool the engine within a closed loop cooling system. For example, a heater core located proximate the inside dashboard of the vehicle receives heated liquid from the engine and circulates the heated liquid around the core. The heater core absorbs heat from the liquid and heats up itself. The heat transferred from the cooling liquid to the heater core cools the liquid. The heated heater core then provides heat to the inside of the vehicle when necessary. The cooling liquid delivered to the heater core comes directly from the engine, and therefore, the temperature of that cooling liquid is a good indicator of the internal engine temperature.

Accordingly, to keep the vehicle engine running properly, the cooling system must also operate properly. Presently, checking a cooling system for proper operation is time consuming and oftentimes inaccurate as well as inefficient. After the engine is started and sufficiently warm, the radiator and thermostat must be individually checked, and the mechanic or owner of the vehicle has to monitor the temperature to make sure that the engine does not overheat. If one of the parts of the cooling system is marginal, the test has to be repeated to insure proper operation. Further, if repairs are made, the cooling system check would have to again be repeated. On average, the check takes from 20 to 30 minutes each time. Furthermore, cooling system repairs take anywhere from 20 minutes to one hour.

In the past, during repair and testing, the mechanic traditionally has had to pay close attention to the vehicle to avoid possible damage to the engine from overheating. Additionally, the engine and cooling system had to be watched for events such as the opening of the thermostat. A knowledgeable mechanic will feel the radiator hoses as the vehicle warms up in order to check temperature and pressure. However, a mechanic, while sometimes being able to determine the operational status of the thermostat and radiator, will not be able to do so in marginal cases.

Properly checking and repairing a cooling system in order to insure that it is operable requires a certain amount of expertise and experience. Even with such expertise, there is uncertainty involved regarding individual components, and even a skilled mechanic may miss marginal cases of component malfunction or failure. Furthermore, with the currently available cooling systems testing and repair procedures, it is often easier to replace a thermostat without regard for its condition than it is to check and make sure that the thermostat is functioning properly. This creates unnecessary expense to the vehicle owner because a mechanic may replace a perfectly good thermostat with a new thermostat. An additional expense during repair work and part replacement is the cost of replacing the coolant or anti-freeze liquid. During repairs, the entire coolant system often has to be drained and then subsequently refilled with new fluid which cumulatively becomes expensive.

Consequently, there is a need for a faster, simpler, more direct way of testing a cooling system in order to determine that it is functioning properly. There is further need for a way for a vehicle owner, who is generally a non-mechanic, to test the cooling system of his vehicle as effectively as a mechanic. Still further, there is a need for a way to quickly and effectively monitor the cooling system so that no time is wasted testing or actually replacing those parts which are operating satisfactorily. Additionally, it is desirable to reduce the amount of time spent on testing partially bad parts which are normally found by the process of elimination. In the past several bad parts in a system generally has required the mechanic or operator to test everything, one at a time. It is further desirable to be able to test and analyze a cooling system without having such testing subject to temperature disturbances outside the closed loop cooling system or other temperature transients outside of the engine.

SUMMARY OF THE INVENTION

In accordance with the objectives discussed above and further objectives evident herein below, the quick connect cooling system diagnostic apparatus of the present invention provides a diagnostic system which can generally be attached to an engine's cooling system in about one minute. The analyzer preferably has three temperature sensors which provide temperature readings from various positions around the cooling system. The temperature readings are compared with each other and processed to give an accurate indication of the condition of the cooling system such as the operability of the thermostat and the radiator. The analyzer operates quickly and efficiently to isolate the main components of the cooling system and to determine whether each of those components is functioning properly. Furthermore, the analyzer evaluates the operation of each component in the overall system to insure that the vehicle engine is maintained at a proper operating temperature.

More specifically, in one embodiment, the diagnostic analyzer comprises a series of sensor cuffs which include temperature sensors. The cuffs attach around various cooling system hoses in seconds and have low thermal time constants to respond quickly to temperature variations in the liquids circulating through the hoses. The cuffs protect the thermal sensors from outside air disturbances such as cooling fans and from other ambient conditions which would affect the temperature readings. Accordingly, accurate temperature readings are provided by each cuff and sensor.

One cuff and sensor of the analyzer system is attached to the heater hose near the engine block. The sensor provides an indicator of the engine temperature by sensing the temperature of the liquid delivered to the heater core directly from the engine block. A second sensor cuff is strapped onto the upper radiator hose proximate the thermostat. The second sensor detects the temperature of the cooling liquid on the radiator side of the thermostat, i.e., the cooling liquid input to the radiator for the engine block. A third sensor is attached to the radiator output hose to measure the temperature of the cooling liquid coming out of the radiator.

The apparatus of the present invention includes an analyzer which is coupled to each of the sensors to receive temperature input signals therefrom. The input signal from the first sensor is input to the analyzer where it is compared to a plurality of temperature threshold signals. If the engine temperature is below a low threshold temperature, the analyzer outputs an indication signal that the engine is cold; if it is above a high threshold temperature, the analyzer indicates that the engine temperature is hot. Similarly, comparison of the first sensor signal to other threshold levels may be used to produce indication signals that the engine is very hot or at an alarm level, for example. The alarm threshold temperature, which may be pre-set by the operator in one embodiment of the invention, will produce a temperature alarm indication signal to denote that the engine temperature has reached a stage where damage to the engine may occur. The analyzer is coupled to output circuitry which receives the indication signals and produces a humanly perceptible output signal such as lights or an alarm sound in response to the indication signals.

The analyzer also compares the temperature of the engine cooling liquid (first sensor) with the temperature of the cooling liquid in the upper or input hose (second sensor) of the radiator. A large difference between these two temperatures indicates that the thermostat is closed because the engine liquid temperature will be higher than the temperature of the liquid in the input hose when there is no liquid circulating due to a closed thermostat. The analyzer and output circuitry provide an indication of the thermostat condition in response to the temperature difference between the first and second sensors. Similarly, the temperature difference between the upper and lower radiator hoses, or input and output hoses (first and second sensors), is analyzed to determine how the radiator is functioning. A small temperature difference between the input and output cooling liquid indicates that the radiator may not be cooling the liquid adequately, whereas a large temperature difference indicates that the radiator is cooling the liquid. The output circuitry provides an indication of the functional status of the radiator. In this way, the diagnostic apparatus of the present invention provides a rapid and accurate indication of the engine temperature and the functionality of both the thermostat and the radiator.

In one variation of the present invention, if the cooling system is operating properly, there will be no audible tones and only indicator lights, such as green lights, which indicate that all the functions of the cooling system are operating. Using the present invention, various other indication schemes might be utilized such as alerting the mechanic with an audible tone when the engine is warmed up so that he may be present to study the engine for temperature related events.

As further discussed below in the detailed description of the invention, the signals from the sensors and the various analyzer signals provided by comparison of the sensor measured temperatures from the sensors are further processed by the analyzer to indicate the condition of the cooling system. For example, the temperature of the engine is accurately indicated, while the signals indicating the condition of the thermostat and the operation of the radiator are further analyzed and processed along with the engine temperature signals to determine whether the thermostat is stuck open or stuck closed and whether the radiator is not operating properly, malfunctioning or marginally operating at a level somewhere therebetween. In accordance with the present invention, any number of different output devices might be utilized such as LEDs, bar graphs, numeric displays, and audible output devices, such as a speaker, to rapidly indicate the condition of the cooling system.

Accordingly, the present invention provides a quick, accurate analysis of an engine cooling system. Using the invention, less skill and knowledge is required to analyze and repair a cooling system problem, and the proper repair may be completed correctly the first time. The analyzer accurately detects problems and can sense small variations in temperature to provide proper analysis and to protect the engine from overheating. With the present invention, unnecessary repair bills may be avoided because the system accurately indicates which parts need to be replaced or repaired. Furthermore, the analyzer indicates which parts in sections of the cooling system are operating properly or malfunctioning in one step and the bad parts in the system do not require individual testing. Still further, because of the simplicity of operation of the present invention, a vehicle owner may more frequently monitor the cooling system of his vehicle or vehicles. For example, such frequent, quick monitoring would be a great advantage for the owner of a company with a fleet of trucks that must be kept in operable condition.

The sensors are easily connected to the cooling system because they are wrapped externally around the hoses. The system is generally not susceptible to outside temperature disturbances or ambient conditions as the sensor cuffs of the present invention protect the thermal sensors. In operation, the sensor cuffs may be attached to the various sections of the cooling system and the vehicle may be started and left unattended until the device detects a problem at which time it may alert the mechanic or operator with an audible tone or visual signal. The mechanic does not have to constantly watch the engine until alerted thus freeing the mechanic to use his time elsewhere.

Since the analyzer may be simply and quickly used, frequent use is not a hassle and will reveal a deteriorating cooling system before there is a problem. Additionally, when the analyzer is used professionally, cooling system analysis and repair time is reduced allowing an increase in business and more efficient use of the mechanic's time. These objectives and other objectives of the present invention will become more apparent in the detailed description of the invention hereinbelow.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF THE INVENTION

Figure 1:
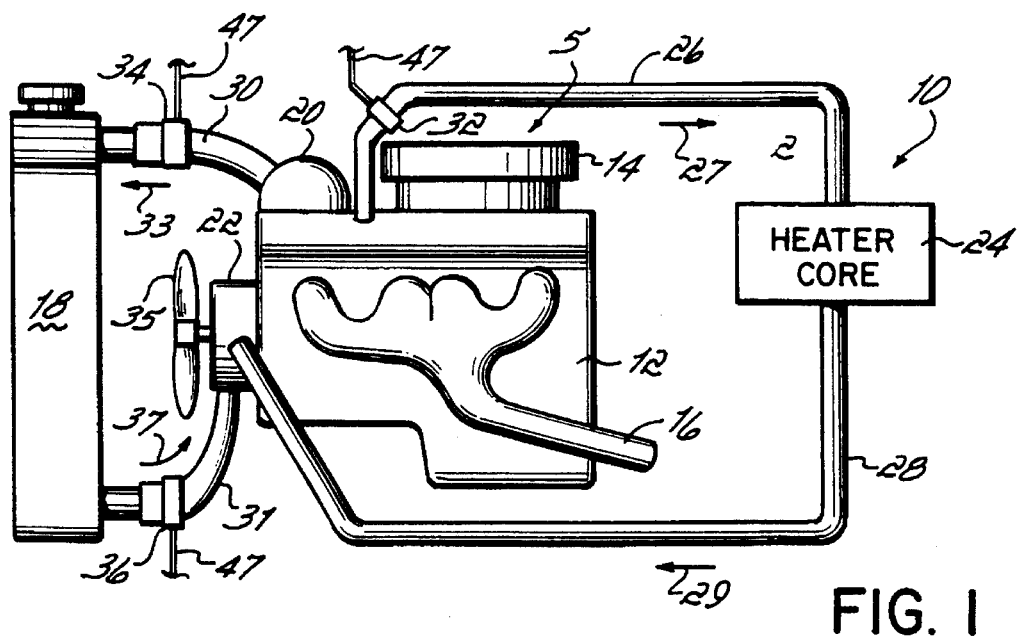
FIG. 1 is a side view of a vehicle engine and closed loop cooling system in use with the quick connect diagnostic system of the present invention.

To understand the present invention, a brief description of an engine cooling system is helpful. FIG. 1 illustrates a typical internal combustion vehicle engine 5 and a closed loop cooling system 10 used to cool the engine 5. The sensors of the present invention 32, 34, 36 are shown attached at various points on the cooling system and are used to take temperature measurements as described in further detail hereinbelow. A typical internal combustion vehicle engine 5 has an engine block 12 which burns fuel and provides power to drive the vehicle. Engine 5 also includes a carburetor 14 for introducing fuel to block 12 and an exhaust system 16 for removing the spent fuel exhaust from block 12. Internal combustion and the operation of the various moving metal parts (not shown) inside the engine block 12 creates heat which must be removed in order for it to function properly.

For cooling engine block 12, the closed loop cooling system 10 comprises a heat exchange unit or radiator 18, a thermostat 20, a water pump 22 and a smaller heat exchange unit, heater core 24. The water pump 22 circulates and recirculates cooling liquid through the engine block 12 and the closed loop system 10 and the liquid absorbs the heat of block 12 and its internal parts. The cooling liquid may be water, antifreeze or a combination of both. Various hoses 26, 28, 30, 31 carry the cooling liquid between the individual components of the cooling system 10. The heated cooling liquid from block 12 is cooled by radiator 18 and heater core 24 and recirculated back to the hot engine block 12. The continuous heat exchange of system 10 promotes proper functioning of the engine 5.

More specifically, water pump 22 pumps cooling liquid through various internal passages in the engine block 12. The liquid travels through block 12 and is heated as it removes heat from block 12. The heated cooling liquid from block 12 then flows through hose 26 to heater core 24. Hose 26 is generally connected to block 12 proximate the thermostat 20. The heater core 24 is a heat exchange unit and the cooling liquid from block 12 circulates around core 24 and transfers its heat to heater core 24 thus raising the temperature of the core 24 and cooling the temperature of the cooling liquid. The flow of the liquid is denoted by arrow 27. The heat from the heater core 24 may then be utilized within the passenger compartment of the vehicle to heat the compartment.

An output hose 28 directs the cooling liquid from the heater core 24 back to the block 12 near the water pump 22 where it is recirculated through block 12 for cooling purposes. Arrow 29 indicates the flow direction of the liquid through hose 28.

The heater core 24 is generally much too small of a heat exchange unit to completely cool liquid and the engine block 12, and therefore, a larger heat exchange unit, such as radiator 18, is necessary. A radiator input hose 30 connects between thermostat 20 and radiator 18. The thermostat 20 is essentially a temperature sensitive valve which opens when the cooling liquid surrounding it is hot and remains closed when the cooling liquid is cold. By remaining closed, when the engine is cold, the thermostat 20 generally blocks the flow of liquid from block 12 through the radiator 18, and allows the cooling liquid in block 12 to heat as quickly as possible. This insures a properly heated engine block 12, which is necessary for efficient internal combustion.

When the cooling liquid in block 12 reaches a certain temperature, indicating proper engine block temperature, the thermostat 20 opens and the water pump 22 pumps cooling liquid out of the engine block 12, through input hose 30, and into the top of the radiator 18 for cooling. The liquid flows in the direction of arrow 33. The thermostat 20 does not directly adjust the temperature of the cooling system 10. Rather, thermostat 20 lets cooling liquid out of the engine block 12 when the liquid at the thermostat 20 is above a set temperature but stops liquid from leaving the engine block 12 if the temperature is below the set temperature. Consequently, a thermostat 20 that is not working properly can cause the engine to overheat or to be underheated. That is, a stuck closed thermostat 20 will never allow cooling of the engine block 12, and a stuck open thermostat 20 will never allow the engine block 12 to heat up to its proper operating temperature.

When thermostat 20 is open, the hot liquid in hose 30 is directed into the radiator 18 and through a series of small tubes within the radiator 18 (not shown). The heat from the liquid soaks into these metal tubes and is carried to convection fins (also not shown). Air circulates around the fins, either through the motion of the vehicle or the turning of fan 35, or both, and removes the heat from the fins. In that way, radiator 18 removes heat from the cooling liquid and dissipates it into the air. The water pump 22 pumps the cooled liquid from the bottom of radiator 18 through hose 31 and into engine block 12 in the direction of arrow 37 where it is again reheated by the heat of block 12. The continuous circulation of cooling fluid maintains the engine block 12 at a proper operating temperature.

Turning now to the quick connect diagnostic system of the present invention, the system utilizes a series of sensors 32, 34 and 36 to detect the temperature of the cooling fluid at various points around the closed loop cooling system 10. Specifically, sensor 32 is attached to hose 26 which directs cooling fluid from the engine block 12 to the heater core 24. Sensor 34 is attached to hose 30 which directs fluid from block 12 through thermostat 20 to radiator 18. Sensor 36 is attached to hose 31 which directs the cooling fluid back into water pump 22 and block 12 after it is cooled by radiator 18. Preferably, sensor 32 is connected to hose 26 as close to the engine block 12 as possible. As a result, sensor 32 detects the temperature of liquid coming from the engine which is indicative of the internal temperature of the block 12, while sensor 34 detects the temperature of the liquid on the radiator side of the thermostat 20 opposite block 12 and sensor 36 detects the temperature of the liquid after it is circulated through the radiator 18. As described further hereinbelow, the temperature measurements from sensors 32, 34, 36 are analyzed to determine the operation of the cooling system 10 in accordance with the objectives of the invention.

Figure 2A:
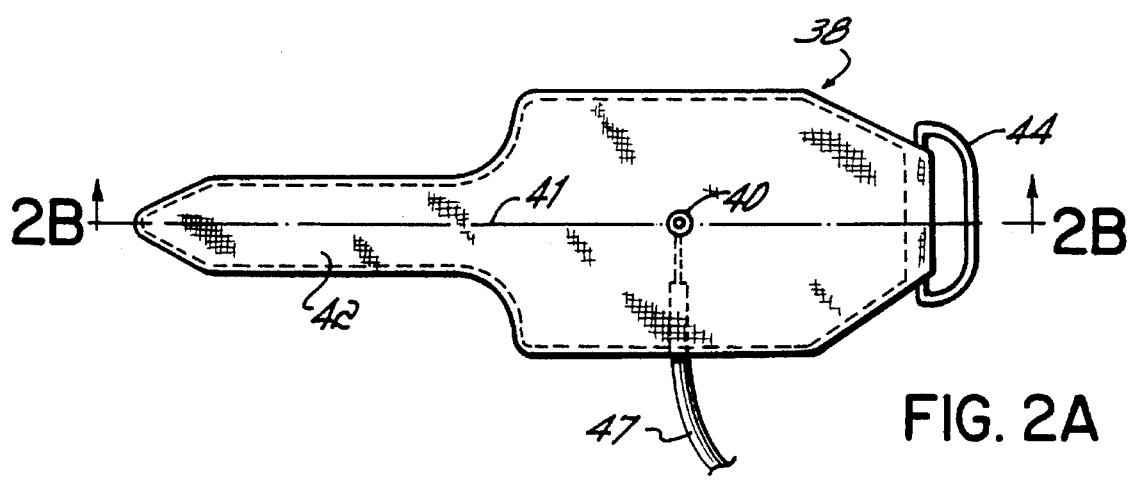
FIGS. 2A and 2B are a top view and side cross-sectional view, respectively, of a sensor cuff used in one embodiment of the present invention.
Figure 2B:
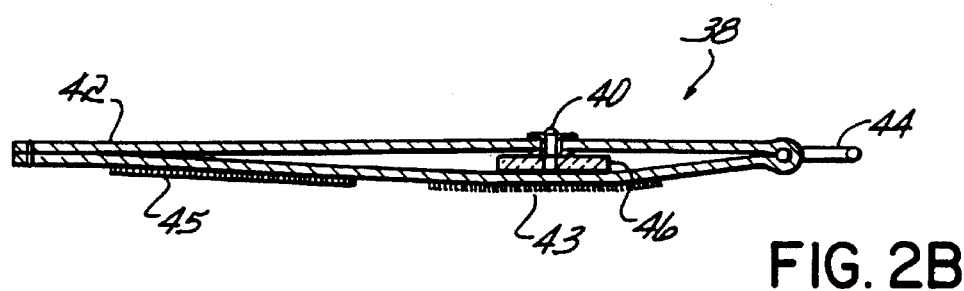

In one embodiment of the present invention, the sensors 32, 34 and 36 include cuffs which house a temperature sensor and wrap around the hoses. Referring to FIGS. 2A and 2B, cuff 38 houses a sensor 40 preferably proximate the longitudinal center 41 thereof. A strap 42 extends from one end of the cuff 38 while a securing ring 44 extends from the other end. On one side of cuff 38 and strap 42 are fastening means, such as hook and loop fasteners 43, 45. Cuff 40 and strap 42 are wrapped around an appropriate cooling system hose as shown in FIG. 1, and the strap 42 is threaded through ring 44 and held down by the hook and loop fasteners 44, 45. Accordingly, other fasteners besides hook and loop fasteners might be utilized. The cuff 38 holds temperature sensor 40 against the hose so the sensor 40 can detect the temperature of the hose corresponding to the temperature of the fluid circulating therein.

The sensor 40 is a temperature sensitive device such as a temperature sensitive resistor or thermistor or a thermocouple or some other equivalent temperature measuring device. A thermistor such as thermistor Model 271–110 available from Radio Shack is utilized in the variation of the invention described herein. The thermistor sensor 40 has an electrical resistance that is proportional to its temperature. Referring to FIG. 2B, a pad of insulating material 46 isolates sensor 40 on one side from exposure to external and ambient temperature conditions. This promotes a more accurate temperature measurement. Sensors 32, 34, 36 are flexible and rugged and may be left on the engine for extended periods of time, without shattering, slipping or breaking under the engine's operating conditions. The sensor cuff 38 is attached by appropriate lines, such as coaxial or twisted paired cable 47 to the analyzer circuitry of the present invention.

Figure 3:
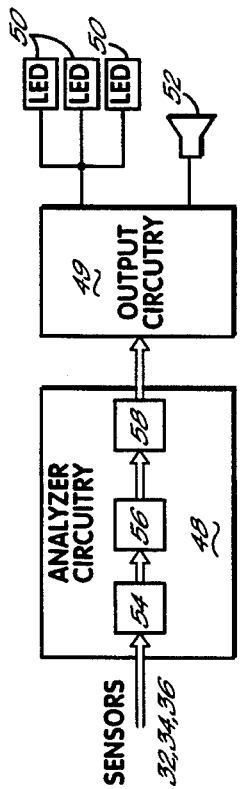
FIG. 3 is an overall block diagram of the circuitry of an embodiment of the present invention.

FIG. 3 is a block diagram of one embodiment of the quick connect diagnostic system of the present invention including sensors 32, 34 and 36, analyzer circuitry 46, output circuitry 48 coupled to the analyzer circuitry 46, and various humanly perceptible output devices such as lights 50 and speaker 52. Similarly, other output devices such as bar graphs, numeric displays or a video screen might be utilized with the present invention to display the conditions of the cooling system in accordance with the invention. The analyzer circuitry 46 includes an input section 54, a threshold measurement section 56 and a logic section 58.

Figure 4:
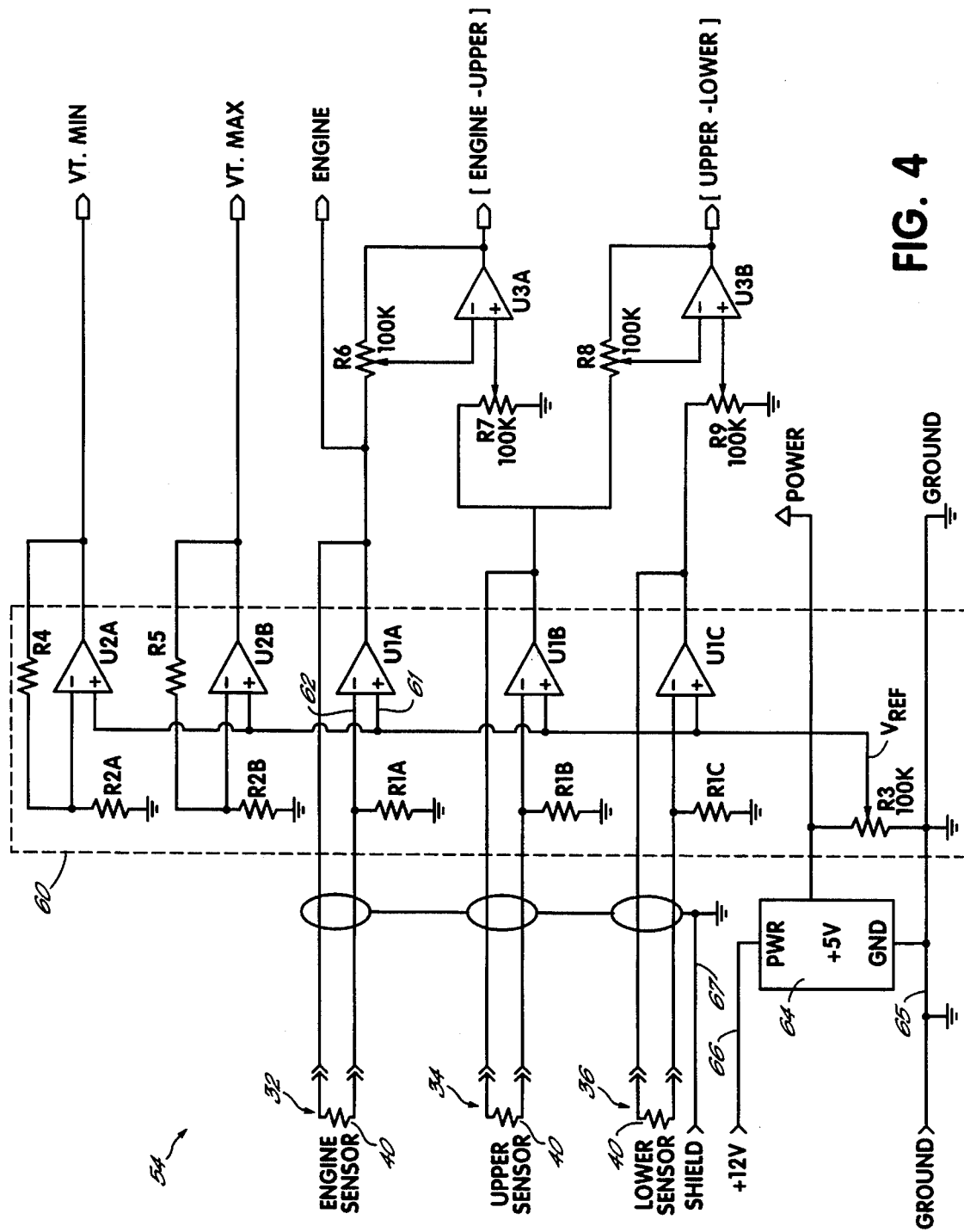
FIG. 4 is a circuit schematic of an input circuit section of the analyzer circuitry in one embodiment of the present invention.

Referring now to FIG. 4, the input section 54 is shown wherein input signals from sensors 32, 34 and 36 are input into a constant current configuration 60. Constant current configuration 60 comprises a series of operational amplifiers U1A, U1B, U1C, U2A and U2B (collectively U1A, B, C, and U2A, B). An example of operational amplifiers suitable for such a purpose are LMC660 available from National Semiconductor. The basic circuit of the constant current configuration 60 consists of an operational amplifier, such as U1A, with a reference voltage $V_{ref}$ applied to the positive feedback terminal 61 and a reference resistance such as R1A. The thermistor resistance element 40 of a sensor, such as sensor 32, is placed between the output of the amplifier U1A and the negative feedback input 62.

In such a configuration, the current flowing through the sensor 32 and associated thermistor 40 is equal to the reference voltage $V_{ref}$ at the positive feedback terminal 61 divided by the reference resistance R1A at the negative feedback terminal 62 (I sensor=$V_{ref}$/R1A). The current is supplied by the output of amplifier U1A. The output voltage from operational amplifier U1A is proportional to the resistance value of the thermistor 40 of sensor 32. Accordingly, temperature changes which effect the resistance value of thermistor 40 will effect the output voltage of amplifier U1A. A similar constant current circuit as described with respect to sensor 32 is repeated for each of the other two sensors 34 and 36 using amplifier U1B and resistor RIB, and amplifier U1C and resistor R1C, respectively. Resistors R1A, R1B and R1C are collectively referred to as R1 resistors.

The reference voltage $V_{ref}$ for input to the positive feedback terminal 61 is established by a 5 Volt power source 64 and a variable resistor or potentiometer R3 which is connected between power source 64 and ground potential 65. The 5 Volt power source 64 may be powered by a 12 volt power source 66 such as a car battery or some other power source such as a standard 9 Volt battery that may be used with a hand held variation of the present invention. A similar constant current circuit is also used for maximum and minimum reference temperature range voltage signals VT.MAX and VT.MIN using operational amplifiers U2A and U2B. The reference voltages from U2A and U2B are established by the resistor pairs, R2A, R4 and R2B, R5, respectively.

The embodiment of the invention illustrated by the circuit of FIG. 4 provides a reference voltage $V_{ref}$ for the constant current configuration 60 from the center tap of potentiometer R3. The resistors R1A, B, C and R2A, B will generally have values falling in the range between 50 and 200 ohms and preferably 100 ohms, although other ranges might be used depending upon the sensor elements 40 and the range of detected engine temperatures. As stated above, the voltage at the center tap of the potentiometer R3, i.e., $V_{ref}$, divided by the resistance value of one of the R1 resistors, yields the current flowing through the thermistors 40 of the sensors 32, 34 and 36. In the disclosed embodiment, the thermistor current is set to provide a maximum voltage swing for the normal temperature range of the vehicle engine, e.g., nominally 100° to 300° F. In order to accomplish circuit isolation, the lines 47 connecting sensors 32, 34 and 36 with the constant current configuration might be shielded, such as by a grounded shield 67.

Amplifiers U2A and U2B are used to set the minimum and maximum temperature range voltage signals VT.MIN and VT.MAX. R5 represents the resistance value corresponding to the maximum temperature measurement expected from the engine sensors and in one embodiment will have a value of approximately 175 ohms, while R4 represents the resistance value corresponding to the minimum temperature measurement expected from the engine sensors and in a similar embodiment will have a value of approximately 5300 ohms. As will be understood by a person of ordinary skill in the art, the reference range temperatures for different vehicles will vary, and therefore, the values of R4 and R5 will need to be varied to correspond to the different temperature ranges in accordance with the principles of the present invention. The reference range voltage signals, i.e., VT.MIN and VT.MAX, resulting from these minimum and maximum resistance values are used as the reference voltages for all other temperature settings in the analyzer circuitry 46. Since the minimum and maximum reference temperature range voltage signals VT.MIN, VT.MAX are set utilizing the same circuit configuration as is used to supply current to the sensors, any deviation in the circuit values such as power supply drift, resistance variations with temperature, or other common mode effects will influence the sensor signals and the reference signals in the same way. This makes the input circuit 54 and constant current configuration 60 relatively immune to circuit variations.

The input section 54 of analyzer circuitry 46 also includes subtracting networks for determining the difference between the temperature sensor voltage signals provided by sensors 32, 34 and 36. Amplifiers U3A and U3B are configured to provide temperature difference voltage signals reflecting the difference between the temperatures measured by sensors 32 and 34 and the temperatures measured by sensors 34 and 36, respectively. For ease of reference, the signal resulting from sensor 32 and amplifier U1A is designated ENGINE because it reflects the temperature of the cooling liquid coming directly out of engine block 12 in hose 26, and hence, reflects the engine temperature. Similarly, the voltage signals resulting from sensors 34 and 36 and their associated operational amplifiers U1B, U1C, respectively, are designated UPPER and LOWER to reflect that they sense the temperature of the cooling liquid in the upper and lower radiator hoses 30, 31. As noted above, the minimum and maximum temperature range voltage signals are designated VT.MIN and VT.MAX.

Although various different temperature sensing elements, such as thermistors 40, might be utilized for sensors 32, 34 and 36, the embodiment disclosed herein uses negative temperature coefficient thermistors. With negative coefficient thermistors, the resistance of the thermistor decreases as the sensed temperature increases. Therefore, since the output voltages from the amplifiers U1A, B, C and U2A, B of the constant current configuration 60 are proportional to the resistance values of sensors 32, 34 and 36, higher temperatures result in lower output voltage signals from the constant current configuration 60.

Operational amplifier U3A is configured as a subtractor circuit and is used to provide the [UPPER-ENGINE] temperature difference signal. That is, amplifier U3A is used to subtract the temperature of the liquid in upper radiator hose 30 (sensor 34) from cooling liquid in the engine (sensor 32). As will be described further hereinbelow the temperature difference signal [ENGINE-UPPER] indicates the open or closed status of thermostat 20. Similarly, amplifier U3B is used to provide a temperature difference signal [UPPER-LOWER] corresponding to the temperature difference between the cooling liquid in the upper and lower radiator hoses 30, 31. The [UPPER-LOWER] signal reflects the operation and efficiency of the radiator 18.

Referring to FIG. 4, operational amplifiers U3A and U3B are actually shown to be configured to subtract the ENGINE signal from the UPPER signal, i.e., [UPPER-ENGINE]. This is necessary because the negative coefficient thermistors produce lower voltage signals for higher temperatures. For example, the temperature of the engine fluid will generally always be greater than or equal to the temperature of the liquid in the upper radiator hose and the ENGINE signal will therefore be less than or equal to the UPPER signal. By configuring the circuit as shown, the operational amplifiers U3A and U3B effectively invert the sign and produce [ENGINE-UPPER] and [UPPER-LOWER] signals which are positive. The output signals of the subtraction [ENGINE-UPPER] and [UPPER-LOWER] are positive voltage signals that are scaled via the feedback resistors R6 and R7 for amplifier U3A and R8, R9 for amplifier U3B. The scaling is accomplished to cover the maximum voltage range at worst case temperature differences. Therefore, the input section 54 of analyzer circuitry 46 utilizes as input signals ENGINE, UPPER and LOWER and produces output signals VT.MIN, VT.MAX, ENGINE, [ENGINE-UPPER] AND [UPPER-LOWER]. These signals are then provided to the signal threshold section 56 of the analyzer circuitry 46 as illustrated in FIG. 5.

Figure 5:
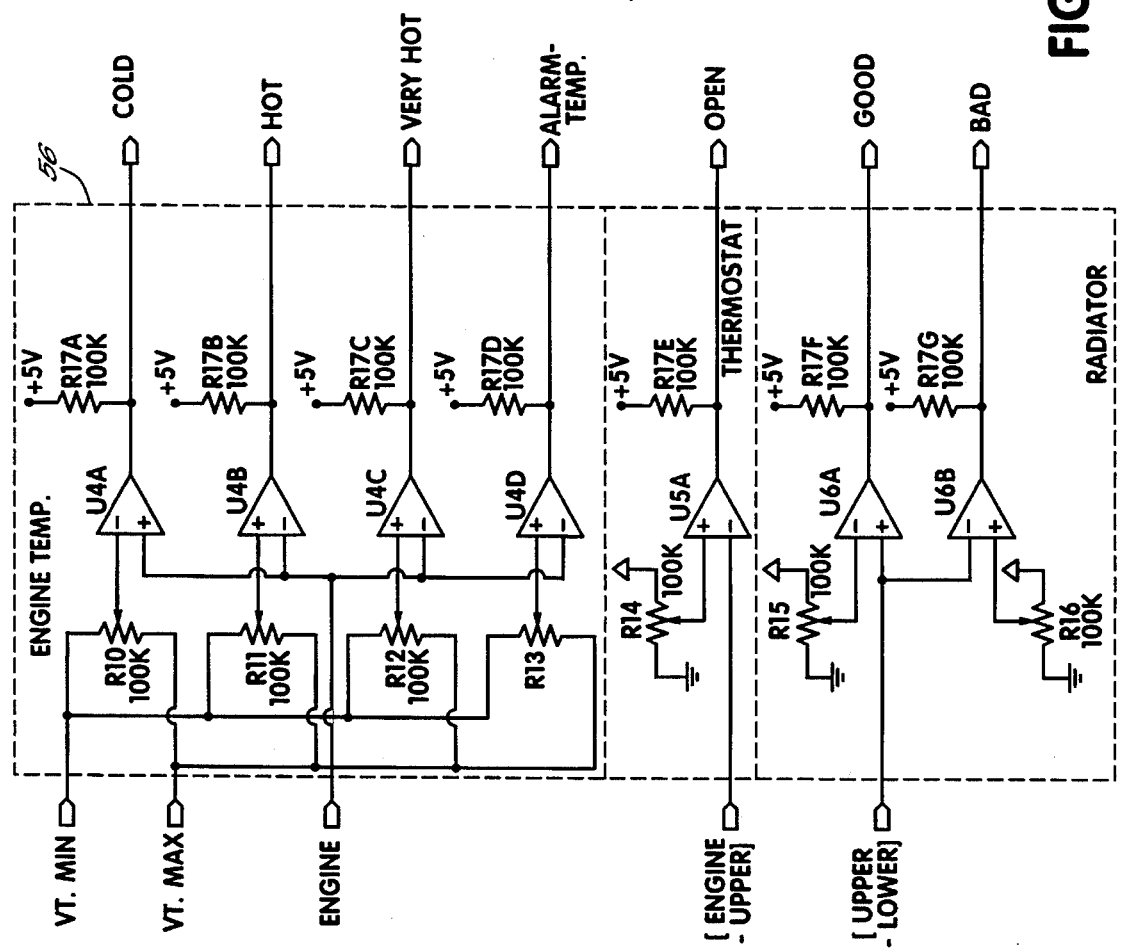
FIG. 5 is a circuit schematic of a threshold circuit section of the analyzer circuitry in one embodiment of the present invention.

Referring now to FIG. 5, the signal threshold section 56 comprises a series of operational amplifiers which are electrically configured as comparators to compare the various temperature and temperature difference signals from the input section 54 to reference threshold signals in order to determine the engine temperature and the operational status of the thermostat and the radiator. The comparators might be operational amplifier comparators such as LM339 available from National Semiconductor. Comparators U4A, U4B, U4C and U4D (collectively U4A, B, C and D) compare ENGINE to a series of temperature threshold signals that span between the reference temperature range signals VT.MIN, VT.MAX. Depending upon the value of ENGINE, an appropriate temperature flag will be set according to whether the engine is cold, hot, very hot, etc.

More specifically, in the circuit of the disclosed embodiment, comparators U4A, B, C and D, utilize VT.MAX and VT.MIN to provide temperature threshold signals determined by potentiometers R10, R11, R12 and R13. Comparator, U4A is used to determine if the engine temperature is below a cold threshold temperature and therefore has an appropriate cold threshold signal which is set by potentiometer R10. If ENGINE is below the threshold signal, the COLD flag is set. The various flags referred to herein are logic flags with appropriate logic states or voltage levels, e.g., 0 volts=FALSE, 5 volts=TRUE. Setting a flag is equivalent to giving it a TRUE value or state. It should be noted that the inputs to the positive and negative terminals of the operational amplifier U4A are reversed from those of U4B, U4C, U4D. This is due to the negative coefficient thermistors used in the present embodiment because lower or colder temperatures are designated by higher voltages. Therefore, in FIG. 5, if ENGINE is higher than the cold threshold signal (i.e., the engine temperature is below a cold threshold temperature) the COLD flag is set. In other words, a cold engine temperature sets the COLD flag.

Somewhat similarly, comparators U4B and U4C are used to indicate that the engine temperature, designated by ENGINE, is above hot and very hot temperature threshold temperatures. The hot and very hot threshold signals are determined by potentiometers R11 and R12, respectively. As the engine temperature increases, the level of ENGINE decreases. As ENGINE drops below the hot threshold signal of R11, the HOT flag is set. If ENGINE continues to decrease (increasing engine temperature), the VERY HOT flag is set. Accordingly, comparators U4B and U4C have their terminals configured so that as ENGINE decreases, signifying an increased engine temperature, the particular flags MOT and VERY HOT will be set.

Comparator U4D is configured similarly to U4B and U4C and utilizes R13 to set an alarm temperature threshold signal. The alarm threshold signal is utilized to indicate that the vehicle engine is at a temperature that may cause damage to the engine. R13 is preferably set by the user to indicate the threshold temperature for an alarm to sound or it may be pre-set. If the engine temperature becomes too hot and ENGINE drops below the alarm threshold signal, the comparator amplifier U4D sets the ALARM TEMP flag. The present invention generates an alarm audible and/or visual alarm in response to the ALARM TEMP signal which notifies the user that there is a problem and that the engine should be shut down in order to prevent engine damage. The voltage endpoints of the potentiometers R10, R11, R12, R13 which determine the various threshold voltage signals are VT.MAX and VT.MIN which are generated as described above in FIG. 4 and input section 54. That is, the voltage range between VT.MAX and VT.MIN is divided by R10, R11, R12, R13 into a series of threshold signals. Other threshold signals might be created by more comparators and potentiometers.

A similar configuration to that used to determine the temperature status of the engine is also utilized to determine the operational status of both the thermostat 20 and the radiator 18. Referring again to FIG. 5, a comparator U5A is used to provide an indication of the thermostat condition. When the temperature difference signal [ENGINE-UPPER] is less than a thermostat threshold voltage signal set by R14, an OPEN flag is set.

For example, when a vehicle engine has been started and is heating up, the cooling liquid in the engine is heated. In the normal operation of the cooling system, the thermostat 20 will remain closed while the engine heats up, and little or no liquid will circulate through the radiator 18 and hoses 30, 31. Therefore, with a closed thermostat 20 the temperature of the liquid in the upper hose 30 will remain cooler than the liquid being directed to heater core 24 which comes directly from the engine block 12. Consequently the difference signal [ENGINE-UPPER] will be relatively large. After the engine heats up sufficiently, the thermostat 20 will open and cooling liquid flowing out of block 12 and into hose 30 and radiator 18 will have a temperature close to the temperature of the liquid in hose 26 as measured by sensor 32. Therefore, when the thermostat 20 is open the difference between signals ENGINE and UPPER should be relatively small and the difference signal [ENGINE-UPPER] will accordingly be relatively small. If the temperature difference signal [UPPER-ENGINE] is small enough i.e., less than the thermostat threshold signal, then U5A will set the OPEN flag to TRUE to indicate that thermostat 20 is open. Conversely, a large temperature difference, indicated by [ENGINE-UPPER] being greater than the thermostat threshold signal, indicates that the thermostat 20 has not yet opened and will leave the OPEN flag in a FALSE state.

Somewhat similarly, the operability of the radiator 18 may be determined. For example, the [UPPER-LOWER] temperature difference signal is compared by comparator amplifiers U6A and U6B to threshold signal levels set by R15 and R16, respectively. A large temperature difference between the liquid in the upper hose 30 and the liquid in the lower hose 31, i.e., a high [UPPER-LOWER] signal, is evidence that the hot cooling liquid is being adequately cooled by radiator 18 before being output to the water pump 22. Conversely, a small [UPPER-LOWER] signal indicates that the output liquid is coming out of the radiator 18 at a temperature close to the temperature at which it was input to the radiator. That indicates that the radiator is not cooling the liquid sufficiently before it is introducing it back into block 12. Accordingly, if the temperature difference signal [UPPER-LOWER] is above the level set by R15, then amplifier U6A will indicate a radiator status of good by setting the GOOD flag to TRUE. If the difference signal is below the level set by R16, then amplifier U6B will indicate a nonefficient or bad radiator status by setting the BAD flag to TRUE.

In summary, the threshold section 56 of analyzer circuitry 46 utilizes the signals VT.MAX, VT.MIN, ENGINE, [ENGINE-UPPER] and, [UPPER-LOWER] to set flags COLD, HOT, ALARM TEMP, OPEN, GOOD and BAD which are indicative of the engine temperature and the operation and status of the thermostat 20 and radiator 18. The flag signals provided by threshold section 56 are then input to a logic section 58 of the analyzer circuitry 46 whereby indication signals are generated for the output circuitry 48 to produce a quick and accurate humanly perceptible output indicative of the status and operation of the vehicle cooling system.

Figure 6:
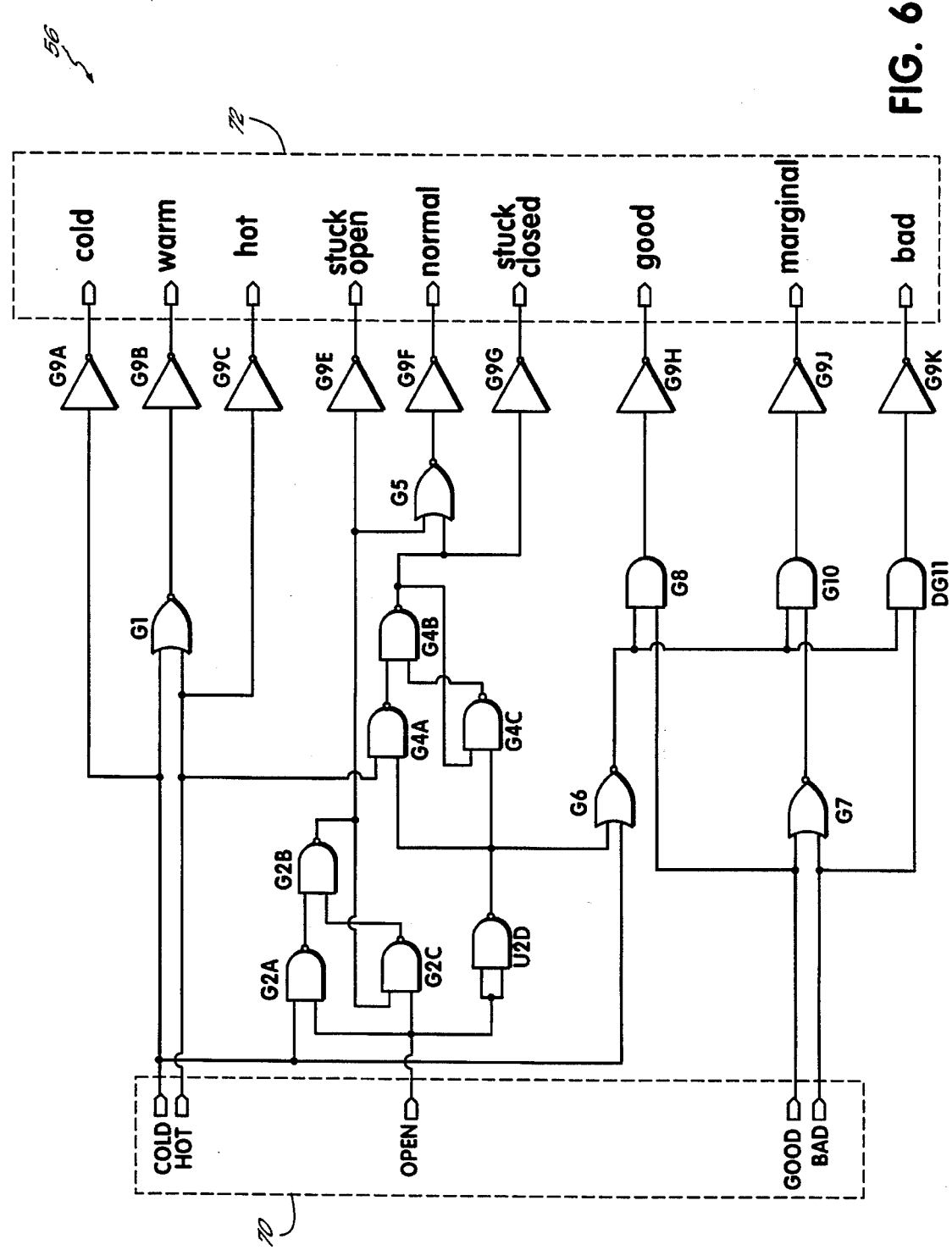
FIG. 6 is a circuit schematic of a logic circuit section of the analyzer circuitry in one embodiment of the present invention.

Referring to FIG. 6, the logic section 58 comprises a series of logic gates which utilize various of the flag values produced by threshold section 56 to produce a series of indication flags utilized by the output circuitry 48. It should be understood, that the gates shown in FIG. 6 illustrate only one embodiment of a logic scheme that might be utilized in accordance with the objectives of the present invention. Therefore, other logic functions and appropriate gates might be chosen without deviating from the scope of the present invention. The logic section receives a series of input flags 70 and generates or sets a series of indication flags 72 in response.

Specifically, NOR gate G1 accomplishes indication of a normal engine temperature by setting the warm indication flag when neither the COLD and HOT flags are set. The COLD and HOT flags are inverted to create cold and hot indication flags by inverters G9A and G9B, respectively.

A set/re-set flip-flop configuration is created with NAND gates G2A, G2B and G2C. Gate G2A provides a clock function that will latch the state of the OPEN flag (i.e., TRUE or FALSE) into the flip-flop when the engine temperature COLD flag changes from TRUE to FALSE. The flip-flop function of G2A, G2B, G2C indicates that the thermostat 20 is stuck open whenever the thermostat OPEN flag is TRUE and the COLD flag is TRUE by setting a stuck open indication flag. In other words, if the thermostat 20 is open when the engine is cold, the system of the present invention indicates that the thermostat is stuck open because a normally operating thermostat should remain closed while the engine is cold.

Similarly, NAND gates G4B and G4C implement a flip-flop design that is clocked with gate G4A. NAND gate G3 inverts the thermostat OPEN flag which is then latched into the flip-flop when the engine temperature HOT flag is TRUE. If the thermostat OPEN flag is FALSE (i.e., the thermostat is closed), and the engine HOT flag is TRUE, the system indicates that the thermostat is stuck closed by setting the stuck closed indication flag. When the engine block 12 has heated up, and the HOT flag is set, a normally operating thermostat 20 should open to allow cooling liquid to circulate through the block 12. By operation of NOR gate G5, when the thermostat 20 is neither stuck open nor stuck closed, and the stuck open and stuck closed indication flags are both FALSE, the invention accomplishes the indication of a normal thermostat by setting the normal indication flag. The various indication flags may be used to produce appropriate outputs with output circuitry 48.

In the embodiment of the invention disclosed herein, the various output circuits (e.g. light emitting diodes) are driven by open collector inverter gates G9A, G9B, G9C, G9E, G9F, G9G, G9H, G9J, G9K (collectively G9A–K). That is, the output circuits will be activated when the input to the inverters G9A–K are in the logic TRUE state (5 volts). However, in another embodiment, the inverters G9A–K might be removed from the circuit 58 to allow a logic TRUE state to drive the output circuitry 48 directly.

Turning now to the radiator logic which indicates the efficiency of the radiator, the NOR gate G7 accomplishes the indication of a marginal radiator condition and sets a marginal indication flag when neither the radiator GOOD nor BAD flags are TRUE. The output of gate G7 feeds into AND gate G10 while the GOOD and BAD flags are input to AND gates G8 and G11, respectively. The output of NOR gate G6 is the other input to each of the AND gates G8, G10 and G11 and prevents the gates and the radiator condition logic from setting any radiator indication flags until the engine temperature is warm and the COLD flag is FALSE, and the thermostat is open and the OPEN flag is set to TRUE. In that way, AND gates G8, G10, G11 prevent any powering of output circuitry regarding the radiator until the thermostat 20 has opened and heated cooling liquid has begun flowing through radiator 18.

As stated above, the output circuitry may utilize any number of different indication schemes to indicate the temperature of the engine, the operation of the thermostat and the operation of the radiator according to the principles of the present invention. LED's, bar graphs or numeric displays might be utilized. For example, in one variation of the present invention, if the cooling system 10 is operating properly, there will be no audible tones and only indicator lights, such as green lights. The present invention is not limited to any particular output or display configuration and obvious variations will be apparent to those of ordinary skill in the art. Furthermore, the different analyzer circuitry and logic schemes utilized to process the sensor inputs into the various different indication signals may also deviate from the detailed description and disclosed embodiment of the invention discussed herein without deviating from the scope of the present invention. For example, variations with equivalent logic and/or comparator circuitry might be utilized without deviating from the scope of the present invention. As a further example of a possible variation, the analyzer circuitry including the threshold and logic sections might be implemented by using a computer or other similar processor. For example, with a computer, the sensor inputs might be fed into an analog-to-digital converter and thereafter input to a table representing the thermistor temperature characteristics whereby the sensor inputs would be converted into a temperature value. The temperature values might then be utilized by a processor programmed according to the currently disclosed invention, to produce useful output signals for the output circuitry.

Accordingly, while the present invention has been illustrated by the description of the embodiments thereof, and while the embodiments have been described in considerable detail, it is not the intention of applicant to restrict or in any way limit the scope of the appended claims to such detail. Additional variations of the invention and additional advantages and modifications will readily appear to those skilled in the art. The invention may be housed in a unit which is placed near the car and powered directly from the car battery, or the invention may be implemented in a hand held unit which is powered by a battery such as a standard 9 Volt battery. Therefore, the invention in its broader aspects is not limited to the specific details, representative apparatus and method, and illustrative examples or variations shown and described. Accordingly, departures may be made from such details without departure from the spirit or scope of applicant's general inventive concept.

What is claimed is:

1. A quick connect diagnostic apparatus for analyzing the cooling system of a vehicle engine including a radiator, a thermostat coupled to the engine, a heater core and various liquid hoses connecting the components of the cooling system, the diagnostic apparatus comprising:

first, second and third temperature sensors, the first sensor configured to attach to a liquid hose containing cooling liquid from the engine to measure the temperature of the liquid in the engine and generate a first signal, the second sensor configured to attach to an input liquid hose to the radiator to measure the temperature of the liquid entering the radiator and generate a second signal, and the third sensor configured to attach to an output liquid hose from the radiator to measure the temperature of the liquid leaving the radiator and generate a third signal;

an analyzer for analyzing the measured temperatures, each of said sensors being electrically coupled to the analyzer, the analyzer comparing the first signal with the second signal to generate a thermostat output signal, comparing the second signal with the third signal to generate a radiator output signal, and using the first signal to generate an engine temperature output signal;

output circuitry electrically coupled to the analyzer to receive the output signals and provide a humanly perceptible output denoting the engine temperature and the operation of the cooling system.

2. The quick connect diagnostic apparatus of claim 1, the analyzer comparing the first signal to at least one temperature threshold signal to generate said engine temperature output signal, the output circuitry receiving said engine temperature output signal and providing an output denoting the temperature of the engine.

3. The quick connect diagnostic apparatus of claim 1 further comprising individual sensor cuffs each housing a sensor and configured to be quickly and easily wrapped around various hoses of the vehicle cooling system to bring said sensors into contact with the hoses.

4. The quick connect diagnostic apparatus of claim 3 wherein each cuff includes insulation material proximate the respective sensor to insulate said sensor from a non-hose temperature effect and promote accurate temperature measurements.

5. The quick connect diagnostic apparatus of claim 1, the sensors being temperature sensitive resistors with an electrical resistance which changes as the temperature of the resistor changes.

6. The quick connect diagnostic apparatus of claim 1, the analyzer comprising a temperature threshold circuit coupled to said first sensor, the temperature threshold circuit comparing said first signal to a plurality of temperature threshold signals corresponding to a plurality of temperature ranges, the analyzer, in response to said comparison, producing an engine temperature output signal indicating the temperature range of the engine.

7. The quick connect diagnostic apparatus of claim 6, the temperature threshold circuit including a plurality of comparing circuits, each comparing circuit receiving said first signal and having an associated temperature threshold signal, the comparing circuits each generating an output signal indicative of the engine temperature when said first signal is one of greater than and less than the associated temperature threshold signal.

8. The quick connect diagnostic apparatus of claim 7 wherein at least one of said temperature threshold signals of the temperature threshold circuit is between maximum and minimum temperature signals in order to define an engine temperature range between maximum and minimum engine temperatures.

9. The quick connect diagnostic apparatus of claim 8, the level of at least one of the maximum and minimum temperature signals being adjustable by the user of the apparatus.

10. The quick connect diagnostic apparatus of claim 6 wherein the temperature threshold circuit and said first sensor are electrically coupled to a power supply such that a shift in the level of the power supply will produce an equal shift in the levels of both the first signal and at least one of said temperature threshold signals.

11. The quick connect diagnostic apparatus of claim 7 wherein a comparing circuit includes at least one operational amplifier and at least one variable resistor to provide said threshold temperature signal to said operational amplifier.

12. The quick connect diagnostic apparatus of claim 1, the analyzer further comprising a subtracting circuit to measure the difference between the first and second signal levels and produce a first difference signal, the analyzer generating a thermostat output signal in response to said first difference signal.

13. The quick connect diagnostic apparatus of claim 12, the analyzer further comprising a thermostat threshold circuit which compares the first difference signal to a thermostat threshold signal, the analyzer, in response to the first difference signal comparison, generating a thermostat output signal.

14. The quick connect diagnostic apparatus of claim 13 wherein the thermostat threshold circuit includes at least one operational amplifier and at least one variable resistor to provide said thermostat threshold signal to said operational amplifier.

15. The quick connect diagnostic apparatus of claim 1, the analyzer further comprising a subtracting circuit to measure the difference between the second and third signal levels and produce a second difference signal, the analyzer generating a radiator output signal in response to said second difference signal.

16. The quick connect diagnostic apparatus of claim 15, the analyzer further comprising a radiator threshold circuit which compares the second difference signal to a radiator threshold signal, the analyzer, in response to the second difference signal comparison, generating a radiator output signal.

17. The quick connect diagnostic apparatus of claim 16 wherein the radiator threshold circuit includes at least one operational amplifier and at least one variable resistor to provide said thermostat threshold signal to said operational amplifier.

18. The quick connect diagnostic apparatus of claim 7, at least one of said comparing circuits having an alarm threshold signal associated therewith and producing an alarm signal in response to said first signal being one of greater than and less than the alarm threshold signal, said output circuitry generating an alarm output in response to said alarm signal.

19. The quick connect diagnostic apparatus of claim 18, the alarm threshold signal having a level which is adjustable by the user of the apparatus.

20. The quick connect diagnostic apparatus of claim 1 wherein the analyzer includes a processor with integrated circuits, the processor being programmed to process the first, second and third signals and generate output signals.

21. A quick connect diagnostic apparatus for attachment to the cooling system of a vehicle engine including a radiator, a thermostat coupled to the engine, a heater core and various liquid hoses connecting the components of the cooling system to analyze the cooling system, the diagnostic apparatus comprising:

first, second and third temperature sensors, the first sensor measuring the temperature of the cooling liquid in the engine and generating a first signal, the second sensor measuring the temperature of the cooling liquid entering the radiator and generating a second signal, the third sensor measuring the temperature of the cooling liquid leaving the radiator and generating a third signal;

an analyzer for analyzing the measured temperatures, each of said sensors being electrically coupled to the analyzer, the analyzer comparing the first signal with the second signal to generate a first difference signal and comparing said first difference signal to a thermostat threshold signal to generate a thermostat signal indicating the operational status of the thermostat;

the analyzer comparing the second signal with the third signal to generate a second difference signal and comparing said second difference signal to a radiator threshold signal to generate a radiator signal indicating the operational status of the radiator;

the analyzer comparing the first signal to a temperature threshold signal to generate an engine temperature signal indicating the engine temperature;

the analyzer utilizing the engine temperature signal, radiator signal, and thermostat signal to generate output signals which indicate the operating conditions of the engine, radiator, and thermostat;

output circuitry electrically coupled to the analyzer to receive the output signals and provide a humanly perceptible output denoting the engine temperature and the operation of the cooling system.

22. The quick connect diagnostic apparatus of claim 21, the operational status of the thermostat comprising one of open and closed;

the operational status of the radiator comprising one of good and bad; and the engine temperature comprises one of hot and cold.

23. The quick connect diagnostic apparatus of claim 22, the analyzer indicating that the thermostat is stuck open when the thermostat signal indicates that the thermostat is open and the engine temperature signal indicates that the engine is cold.

24. The quick connect diagnostic apparatus of claim 22, the analyzer indicating the thermostat is stuck closed when the thermostat signal indicates that the thermostat is closed and the engine temperature signal indicates that the engine is hot.

25. The quick connect diagnostic apparatus of claim 22, the analyzer indicating that the radiator is operating marginally when the radiator signal does not indicate that the radiator is operating one of properly and poorly.

26. The quick connect diagnostic apparatus of claim 21 wherein the analyzer includes a processor with integrated circuits, the processor being programmed to process the first, second and third signals and provide said first and second difference signals.

27. A method of analyzing the cooling system of a vehicle engine including a radiator, a thermostat coupled to the engine, a heater core and various liquid hoses connecting the components of the cooling system, the method comprising:

measuring the temperature of cooling liquid in the engine with a sensor and generating a first electrical signal in response to the measured temperature;

measuring the temperature of cooling liquid entering the radiator with a sensor and generating a second electrical signal in response to the measured temperature;

measuring the temperature of cooling liquid leaving the radiator with a sensor and generating a third electrical signal in response to the measurement;

electronically inputting said signals from said sensors into an analyzer, the analyzer automatically comparing the first signal to the second signal to generate a thermostat output signal indicative of the operation of the thermostat;

comparing, with the analyzer, the second signal with the third signal to generate a radiator output signal indicative of the operation of the radiator;

comparing, with the analyzer, the first signal to a temperature threshold signal to generate an engine temperature output signal indicative of the engine temperature;

electronically outputting the output signals to an indicator for producing humanly perceptible indications denoting the engine temperature and the operation of the radiator and thermostat.

28. The method of claim 27 further comprising:

attaching a first sensor to a liquid hose between the engine and the heater core to provide said first signal;

attaching a second sensor to a liquid input hose of the radiator to provide said second signal; and attaching a third sensor to a liquid output hose of the radiator to provide said third signal.

29. The method of claim 27 further comprising comparing with the analyzer the first signal to a plurality of temperature threshold signals, each threshold signal indicative of a temperature range; generating an engine temperature output signal indicative of the range of the engine temperature.

30. The method of claim 29 wherein one of said temperature threshold signals is an alarm threshold signal, the method further comprising:

generating an alarm output in response to the comparison of the first signal to the alarm threshold signal.

31. The method of claim 27 further comprising: generating a first difference signal in response to the comparison of the first and second signals;

comparing with the analyzer said first difference signal to a thermostat threshold signal;

generating said thermostat output signal which indicates that the thermostat is one of open and closed in response to the comparison of the first difference signal.

32. The method of claim 27 further comprising:

comparing the second and third signals to generate a second difference signal;

comparing with the analyzer the second difference signal to a radiator threshold signal;

generating a radiator output signal which indicates that the operation of the radiator is one of good, bad and neither good nor bad and in response to the comparison of the second difference signal.

33. The method of claim 31 further comprising:

generating an engine temperature output signal which indicates that the engine temperature is one of hot, cold and neither hot nor cold.

34. The method of claim 33 further comprising:

indicating that the thermostat is stuck open when the engine temperature output signal indicates the engine is cold and the thermostat output signal indicates the thermostat is open.

35. The method of claim 33 further comprising:

indicating that the thermostat is stuck closed when the engine temperature output signal indicates the engine is hot and the thermostat output signal indicates the thermostat is closed.

36. The method of claim 32 further comprising:

indicating that the radiator is operating marginally when the radiator output signal indicates that the radiator operation is neither good nor bad.

\* \* \* \* \*

UNITED STATES PATENT AND TRADEMARK OFFICE
CERTIFICATE OF CORRECTION

PATENT NO. : 5,526,871
DATED : June 18, 1996
INVENTOR(S) : Marshall R. Musser and George A. Brunemann, Jr.

It is certified that error appears in the above-indentified patent and that said Letters Patent is hereby corrected as shown below:

In Column 8, line 29, "RIB" should be --R1B--.

In Column 11, line 6, "MOT" should be --HOT--.

Signed and Sealed this

Fourth Day of March, 1997

*Attest:*

BRUCE LEHMAN

*Attesting Officer*     Commissioner of Patents and Trademarks